United States Patent
Irie (10) Patent No.: US 6,547,548 B1
(45) Date of Patent: Apr. 15, 2003

(54) TIRE VULCANIZING SYSTEM AND MOLD OPENING/CLOSING AND VULCANIZING STATION THEREFOR

(75) Inventor: Nobuhiko Irie, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/719,328

(22) PCT Filed: Apr. 30, 1999

(86) PCT No.: PCT/JP99/02316

§ 371 (c)(1),
(2), (4) Date: Dec. 8, 2000

(87) PCT Pub. No.: WO00/66336

PCT Pub. Date: Nov. 9, 2000

(51) Int. Cl.[7] ............................................. B29C 35/02
(52) U.S. Cl. ..................... 425/34.1; 425/38; 425/48; 425/186; 425/195
(58) Field of Search ...................... 425/34.1, 38, 48, 425/186, 195

(56) References Cited

U.S. PATENT DOCUMENTS

| | | | | |
|---|---|---|---|---|
| 5,681,594 A | * | 10/1997 | Irie | 425/34.1 |
| 5,723,154 A | * | 3/1998 | Irie et al. | 425/34.1 |
| 5,820,885 A | * | 10/1998 | Irie | 425/34.1 |

FOREIGN PATENT DOCUMENTS

| | | | |
|---|---|---|---|
| EP | 0 459 375 A2 | 12/1991 | |
| EP | 0 510 332 A2 | 10/1992 | |
| EP | 0 684 126 A2 | 11/1995 | |
| EP | 0 712 705 A2 | 5/1996 | |
| EP | 0 718 082 A2 | 6/1996 | |
| JP | 4-250008 A | 9/1992 | |
| JP | 8-164528 A | 6/1996 | |
| JP | 8-174553 A | 7/1996 | |
| JP | 8-238626 A | 9/1996 | |
| JP | 11-138544 A | 5/1999 | |
| JP | 11-138555 A | 5/1999 | |

OTHER PUBLICATIONS

European PCT Search Report in connection with PCT Patent Appl. No. 99918279.3; May 28, 2002; three pages.

* cited by examiner

Primary Examiner—James P. Mackey
(74) Attorney, Agent, or Firm—Alston & Bird LLP (57) ABSTRACT

A tire vulcanizing system has a mold assembly M for vulcanizing a tire, which has a bladder assembly M300 which is supplied with a heating/pressurizing medium, a heating chamber C1a at the outer peripheral portion of a tire mold C, and upper and lower heating plates M100A and M200A of the tire mold, and is configured movably and so as to be capable of overcoming a force to open the mold by means of the pressure in a bladder BL; a plurality of mold opening/closing and vulcanizing stations 300 each of which receives the mold assembly M and opens and closes the same, and has a vulcanized tire unloader 302, a green tire loader 301, and a bladder operating/driving device 314; a changing/preheating station 200 which performs the change and preheating of the tire mold C incorporated in the mold assembly M and a bladder assembly 300; and mold transportation apparatus 100 which reciprocates between these two stations 300 and 200 to transport the mold assembly M. Also, the mold opening/closing and vulcanizing station 300 comprises a base frame 305, a pillar 306 for elevation and guidance, which is erected on the base frame 305, an upper movable plate 310 which can freely be moved vertically by being guided by the pillar 306, and connecting/disconnecting device 312 for connecting and disconnecting the upper movable plate 310 to and from the tire mold assembly M.

20 Claims, 5 Drawing Sheets

TIRE VULCANIZING SYSTEM AND MOLD OPENING/CLOSING AND VULCANIZING STATION THEREFOR

TECHNICAL FIELD

The present invention relates to a tire vulcanizing system in which tire vulcanization, mold change, bladder change, mold preheating, green tire supply, and vulcanized tire discharge are performed, and a mold opening/closing and vulcanizing station therefor.

BACKGROUND ART

Generally, a tire vulcanizing press is mounted with a tire mold suitable for a tire to be manufactured. For this tire mold, the interior of the mold must be cleaned regularly to maintain the quality of tire. Also, in order to change the size of tire to be manufactured or the tire surface pattern, the mold must be changed during the production. Further, the mold contaminated during production is sometimes removed to be cleaned, and installed again to be used after cleaning.

When the tire mold is changed, a procedure is used in which the fastening of an upper half mold of the mold to an upper pressurizing/heating plate on the press side and the fastening of a lower half mold of the mold to a lower pressuring/heating plate on the press side are released, the mold is taken out to the outside by using a forklift, an overhead traveling crane, etc., and a new mold is installed by the reversing procedure to start the production.

In the mold change operation, it is ideal that the used mold is removed and changed to a new mold immediately after a final tire has been vulcanized in the mold to be changed so that the production can be started immediately by using the new mold. Actually, however, the arrival of a new tire to be installed is delayed, or the posting of an assistant operator is delayed, resulting in a time loss. Also, the mold is in a cool state, or even if the mold has been preheated, the press is often located far from the mold storage space. Moreover, the mold has not been heated enough to start the production immediately. As a result, the preheating operation in the press is needed after the mold change, leading to a decrease in the productivity.

For the above-described reasons, in order to avoid the decrease in the productivity, the frequency of mold change for the tire vulcanizing press is decreased to the utmost, that is, some quantities of tires must inevitably be produced continuously. However, such a continuous production cannot meet the need for decreasing the volume of inventories of products to the utmost in the recent situation in which the types of tire have increased.

From this point of view, the applicant has proposed a tire vulcanizing system disclosed in Japanese Patent Provisional Publication No. 8-164528 (No. 164528/1996). However, this system also has the following problem: Although tires can be produced efficiently if the vulcanization time at all vulcanizing stations is uniform, it is considerably difficult to make the vulcanization time uniform at present, so that the vulcanization time must be determined for each tire.

Therefore, the present tire vulcanizing system is desired to have the following features:

(1) Even if the frequency of mold change is increased, the productivity of the vulcanizing system is not decreased.

(2) When the mold is changed and a new mold is installed to a vulcanizing machine, the mold has been heated enough to a temperature level at which the mold can be used.

(3) At least the mold changing operation in each vulcanizing machine and the attaching/detaching operation of a supply pipe for a heating/pressurizing medium can be performed in an unattended manner.

(4) The production can be made in a different vulcanization time for each mold (for each tire).

(5) The supply equipment for a green tire well matches the mold changing equipment.

A mold mounting apparatus and a mold conveying system for a tire vulcanizing machine have been disclosed in Japanese Patent Provisional Publication No. 6-71651 (No. 71651/1994) and Japanese Patent Provisional Publication No. 6-99437 (No. 99437/1994), but these are not satisfactory for the following reasons:

(1) The mold being transported is not provided with a heating plate, so that the temperature decreases during transportation.

(2) Work (performed by hands of the operator) for installing a mold at the position of each vulcanizing machine, and for opening the mold once to install a bladder assembly in the mold is needed. Further, the decrease in mold temperature during this work is inevitable.

(3) A supply pipe for a heating medium to a heating chamber at the outer peripheral portion of the mold must be attached and detached manually by the operator.

(4) Because it is necessary to heat the tire mold in a state in which upper and lower heating plates of a mold preheating machine and the tire mold are brought into close contact with each other, a mold pressurizing apparatus is needed at the position of the mold preheating machine, which makes the mold mounting apparatus disadvantageous economically.

DISCLOSURE OF THE INVENTION

The present invention has been made in view of the above situation, and accordingly an object thereof is to provide a tire vulcanizing system and a mold opening/closing and vulcanizing station therefor, in which tires can be produced efficiently without the decrease in the rate of operation of the mold opening/closing and vulcanizing station even if the frequency of mold change increases.

To solve the problems with the above-described prior art, the present invention provides a vulcanizing system comprising a mold assembly for vulcanizing a tire, which has a bladder assembly located in the tire to be supplied with a heating/pressurizing medium, a heating chamber at the outer peripheral portion of a tire mold, and upper and lower heating plates of the tire mold, and is configured movably and so as to be capable of overcoming a force to open the mold by means of the pressure in a bladder; a plurality of mold opening/closing and vulcanizing stations each of which receives the tire mold assembly and opens and closes the same, and has a vulcanized tire unloader, a green tire loader, and operating/driving means for a bladder assembly in the tire mold assembly; at least one set of changing/preheating station which performs the change of the tire mold incorporated in the mold assembly and the bladder assembly and the preheating thereof after change; and mold transportation means which reciprocates between the mold opening/closing and vulcanizing station and the changing/preheating station to transport the mold assembly.

In the present invention, green tire supply means or vulcanized tire carry-out means of the mold opening/closing and vulcanizing station is provided above the travel region of a transportation carriage of the mold transportation means.

Also, in the present invention, the mold opening/closing and vulcanizing station has mold opening/closing means comprising a base frame, at least one pillar for elevation and guidance, which is erected on the base frame, an upper movable beam which can freely be moved vertically by being guided by the pillar, and connecting/disconnecting means for connecting and disconnecting the upper movable beam to and from the tire mold assembly.

Also, in the present invention, the mold opening/closing and vulcanizing station comprises a base frame, at least one pillar for elevation and guidance, which is erected on the base frame, a base for sliding the mold assembly and positioning means provided on the base frame at the right and left of the pillar, bladder operating/driving means which is disconnected from and connected to the bladder assembly in the tire mold assembly provided at the right and left of the base frame, and heating/pressurizing medium supply means which is disconnected from and connected to the mold assembly to supply a heating/pressurizing medium into a heating chamber, a heating plate, and the bladder assembly of the tire mold assembly.

Further, in the present invention, the mold opening/closing and vulcanizing station comprises a base frame, at least one pillar for elevation and guidance, which is erected on the base frame, an upper movable beam which can freely be moved vertically by being guided by the pillar, and connecting/disconnecting means for connecting and disconnecting the upper movable beam to and from the tire mold assembly, and has tire mold opening/closing means configured so as to open and close the tire mold assemblies on both sides of the pillar simultaneously or individually.

As described above, the a vulcanizing system in accordance with the present invention comprises a mold assembly for vulcanizing a tire, which has a bladder assembly located in the tire to be supplied with a heating/pressurizing medium, a heating chamber at the outer peripheral portion of a tire mold, and upper and lower heating plates of the tire mold, and is configured movably and so as to be capable of overcoming a force to open the mold by means of the pressure in a bladder; a plurality of mold opening/closing and vulcanizing stations each of which receives the tire mold assembly and opens and closes the same, and has a vulcanized tire unloader, a green tire loader, and operating/driving means for a bladder assembly in the tire mold assembly; at least one set of changing/preheating station which performs the change of the tire mold incorporated in the mold assembly and the bladder assembly and the preheating thereof after change; and mold transportation means which reciprocates between the mold opening/closing and vulcanizing station and the changing/preheating station to transport the mold assembly. Therefore, the following effects can be achieved.

(1) There can be provided an efficient vulcanizing station in which the rate of operation of the mold opening/closing and vulcanizing station is not decreased even if the frequency of mold change increases.

(2) The tire mold, heating plate, heating chamber, and bladder assembly are taken out from the mold opening/closing and vulcanizing station in a unit, and these elements can be returned to the mold opening/closing and vulcanizing station in a state in which all operations relating to the mold change have been finished at the dedicated mold changing/preheating station, and can be connected automatically. Therefore, fully automatic operation at the mold opening/closing and vulcanizing station can be performed, whereby the productivity of tires can be increased.

Moreover, in the tire vulcanizing system in accordance with the present invention, green tire supply means or vulcanized tire carry-out means of the mold opening/closing and vulcanizing station can be provided above the travel region of a transportation carriage of the mold transportation means. Therefore, by disposing the green tire supply means above the mold transportation means, the space can be utilized effectively.

Also, in the tire vulcanizing system in accordance with the present invention, the mold opening/closing and vulcanizing station has mold opening/closing means comprising a base frame, at least one pillar for elevation and guidance, which is erected on the base frame, an upper movable beam which can freely be moved vertically by being guided by the pillar, and connecting/disconnecting means for connecting and disconnecting the upper movable beam to and from the tire mold assembly, or comprises a base frame, at least one pillar for elevation and guidance, which is erected on the base frame, a base for sliding the mold assembly and positioning means provided on the base frame at the right and left of the pillar, bladder operating/driving means which is disconnected from and connected to the bladder assembly in the tire mold assembly provided at the right and left of the base frame, and heating/pressurizing medium supply means which is disconnected from and connected to the mold assembly to supply a heating/pressurizing medium into a heating chamber, a heating plate, and the bladder assembly of the tire mold assembly. Therefore, a check valve is provided at each port of the heating plate and the heating chamber to seal the heating/pressurizing medium even during the transportation, and immediately after the tire mold assembly arrives at the mold opening/closing and vulcanizing station, the tire production can be started, whereby the tire productivity is improved.

Further, in the tire vulcanizing system in accordance with the present invention, the mold opening/closing and vulcanizing station comprises a base frame, at least one pillar for elevation and guidance, which is erected on the base frame, an upper movable beam which can freely be moved vertically by being guided by the pillar, and connecting/disconnecting means for connecting and disconnecting the upper movable beam to and from the tire mold assembly, and has tire mold opening/closing means configured so as to open and close the tire mold assemblies on both sides of the pillar simultaneously or individually. Therefore, each mold assembly can be opened and closed at each mold opening/closing and vulcanizing station, so that a tire can be produced in a vulcanization time for an individual mold, whereby the tire production can be achieved efficiently.

In addition, to solve the problems with the above-described prior art, the present invention provides a mold opening/closing and vulcanizing station comprising a base frame, at least one pillar for elevation and guidance, which is erected on the base frame, an upper movable beam which can freely be moved vertically by being guided by the pillar, and connecting/disconnecting means for connecting and disconnecting the upper movable beam to and from a tire mold assembly.

Also, the present invention provides a mold opening/closing and vulcanizing station comprising a base frame, at least one pillar for elevation and guidance, which is erected on the base frame, a base for sliding a mold assembly and positioning means provided on the base frame at the right and left of the pillar, bladder operating/driving means which is disconnected from and connected to a bladder assembly in the tire mold assembly provided at the right and left of the base frame, and heating/pressurizing medium supply means which is disconnected from and connected to the mold assembly to supply a heating/pressurizing medium into a heating chamber, a heating plate, and the bladder assembly of the tire mold assembly.

Further, the present invention provides a mold opening/closing and vulcanizing station comprising a base frame, at least one pillar for elevation and guidance, which is erected on the base frame, an upper movable beam which can freely be moved vertically by being guided by the pillar, and connecting/disconnecting means for connecting and disconnecting the upper movable beam to and from a tire mold assembly, and having tire mold opening/closing means configured so as to open and close the tire mold assemblies on both sides of the pillar simultaneously or individually.

As described above, the mold opening/closing and vulcanizing station in accordance with the present invention comprises a base frame, at least one pillar for elevation and guidance, which is erected on the base frame, an upper movable beam which can freely be moved vertically by being guided by the pillar, and connecting/disconnecting means for connecting and disconnecting the upper movable beam to and from a tire mold assembly. Therefore, there can be provided an efficient vulcanizing station in which the rate of operation of the mold opening/closing and vulcanizing station is not decreased even if the frequency of mold change increases.

Also, the mold opening/closing and vulcanizing station in accordance with the present invention comprises a base frame, at least one pillar for elevation and guidance, which is erected on the base frame, a base for sliding a mold assembly and positioning means provided on the base frame at the right and left of the pillar, bladder operating/driving means which is disconnected from and connected to a bladder assembly in the tire mold assembly provided at the right and left of the base frame, and heating/pressurizing medium supply means which is disconnected from and connected to the mold assembly to supply a heating/pressurizing medium into a heating chamber, a heating plate, and the bladder assembly of the tire mold assembly. Therefore, a check valve is provided at each port of the heating plate and the heating chamber to seal the heating/pressurizing medium even during the transportation, and immediately after the tire mold assembly arrives at the mold opening/closing and vulcanizing station, the tire production can be started, whereby the tire productivity is improved.

Further, the mold opening/closing and vulcanizing station in accordance with the present invention comprises a base frame, at least one pillar for elevation and guidance, which is erected on the base frame, an upper movable beam which can freely be moved vertically by being guided by the pillar, and connecting/disconnecting means for connecting and disconnecting the upper movable beam to and from a tire mold assembly, and has tire mold opening/closing means configured so as to open and close the tire mold assemblies on both sides of the pillar simultaneously or individually. Therefore, each mold assembly can be opened and closed at each mold opening/closing and vulcanizing station, so that a tire can be produced in a vulcanization time for an individual mold, whereby the tire production can be achieved efficiently.

BEST MODE FOR CARRYING OUT THE INVENTION

Figure 1:
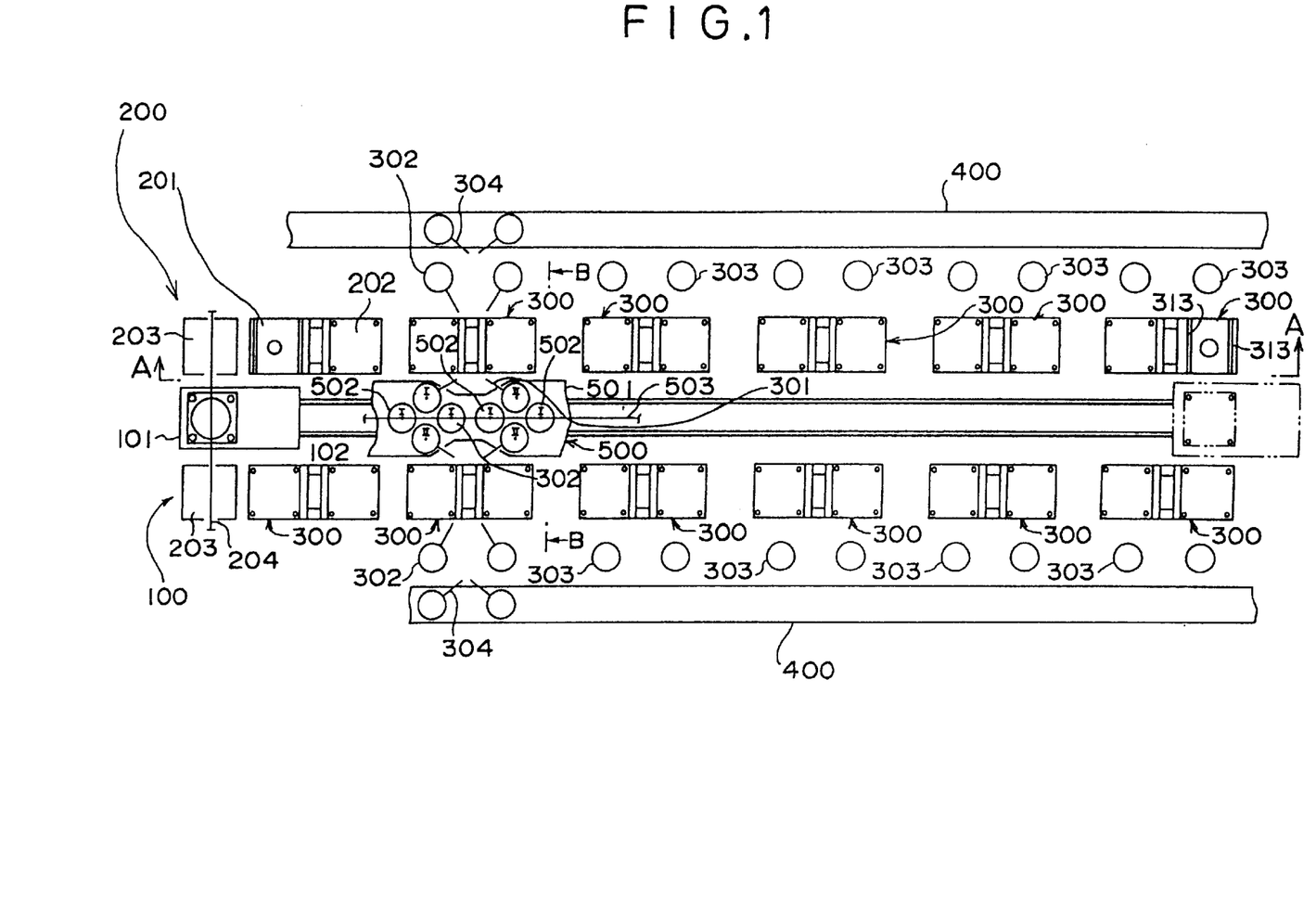
FIG. 1 is a plan view showing the whole of a tire vulcanizing system having mold opening/closing and vulcanizing stations in accordance with embodiments of the present invention.
Figure 2:
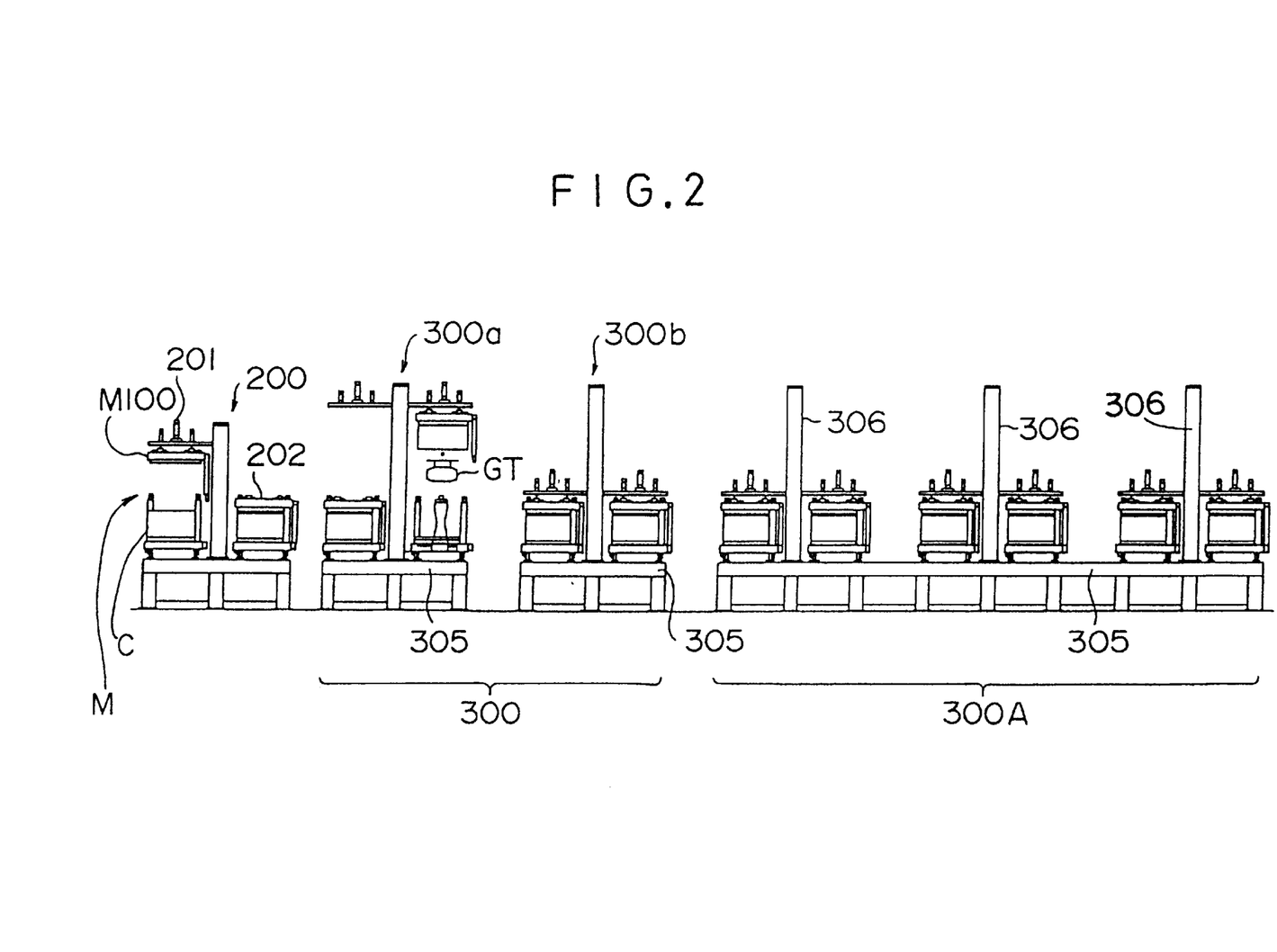
FIG. 2 is a front view taken in the direction of the arrows along the line A—A of FIG. 1, showing a mold changing/preheating station and mold opening/closing and vulcanizing stations, in which both of first and second embodiments of the mold opening/closing and vulcanizing station are shown.
Figure 3:
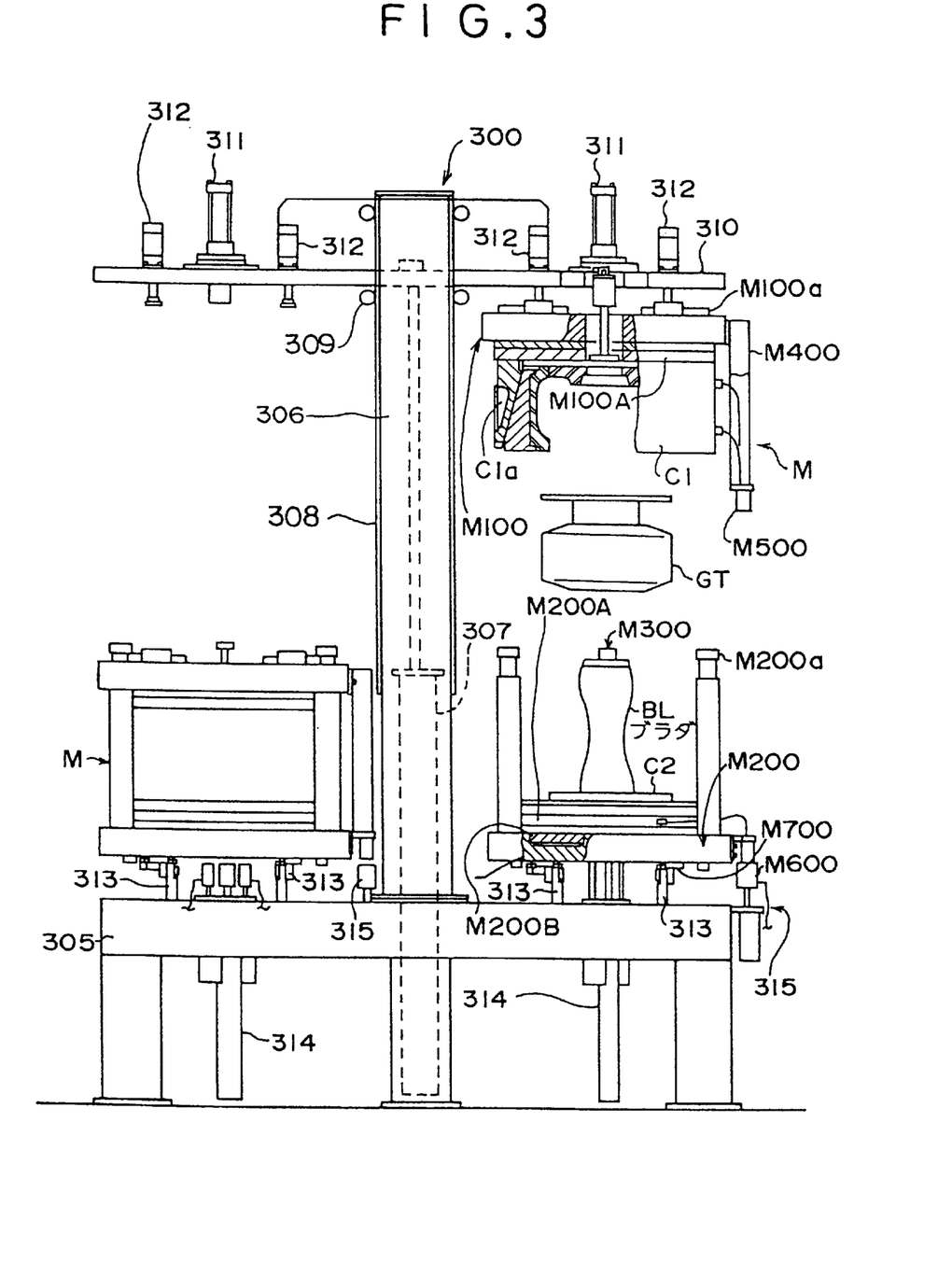
FIG. 3 is an enlarged front view of a mold opening/closing and vulcanizing station in accordance with the first embodiment shown in FIG. 2.
Figure 4:
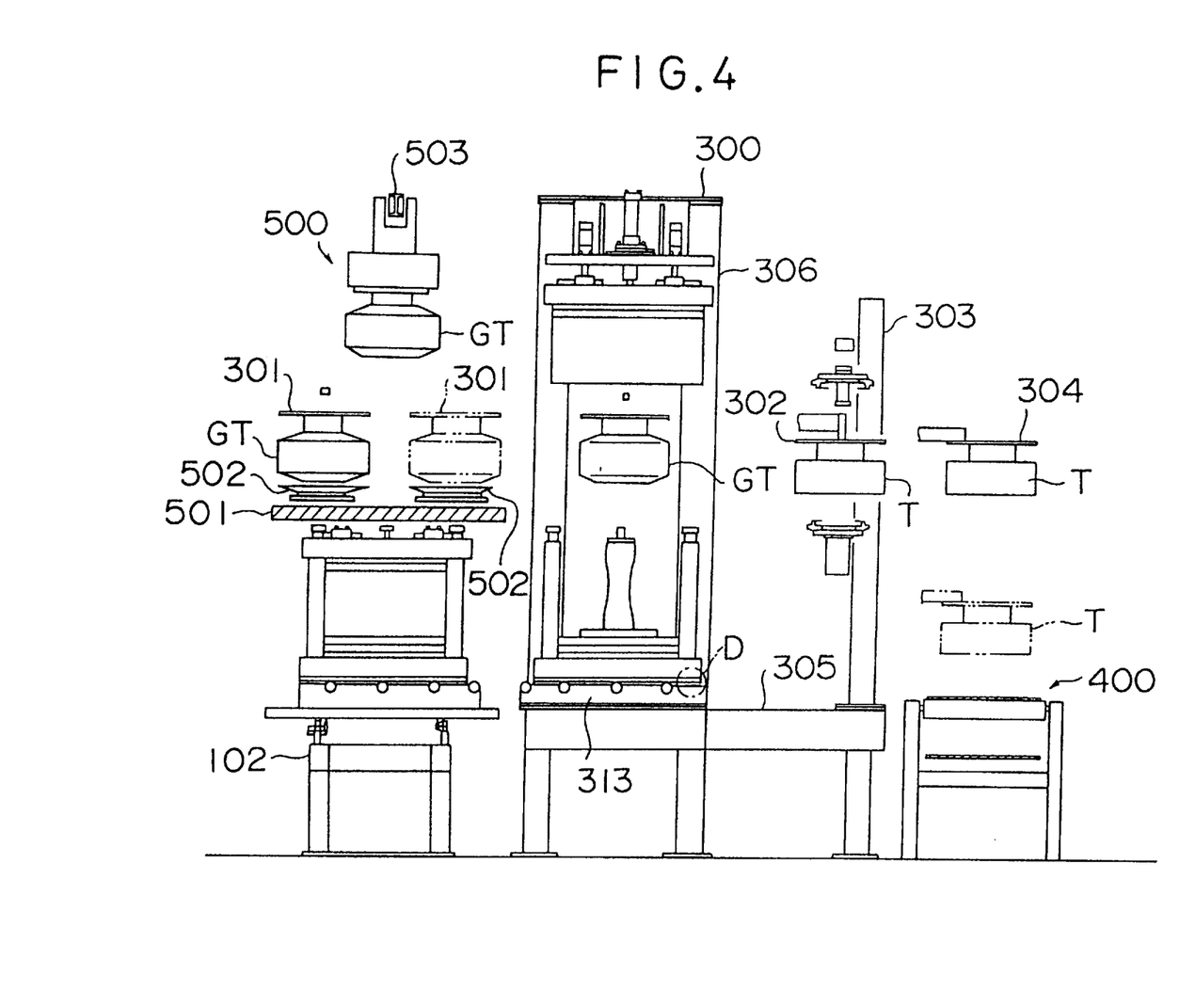
FIG. 4 is a side view taken in the direction of the arrows along the line B—B of FIG. 1, showing a mold opening/closing and vulcanizing station, in which the right-hand state of FIG. 3 is shown.
Figure 5:
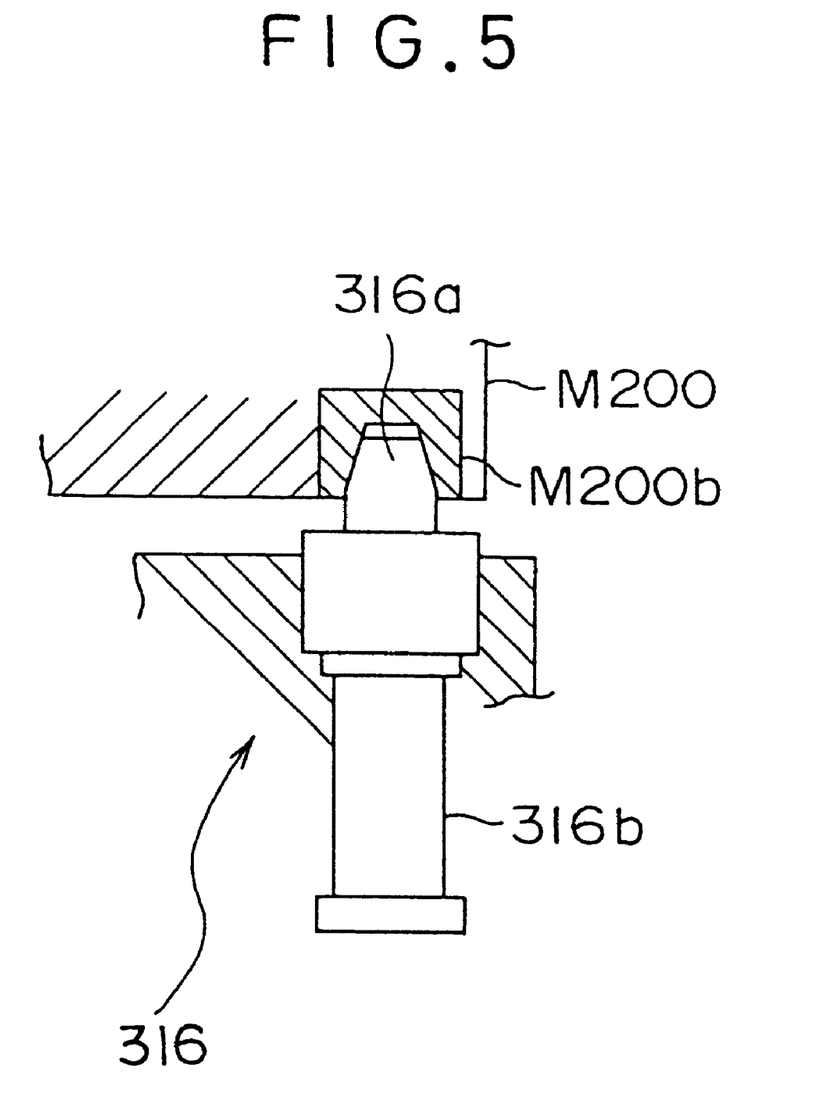
FIG. 5 is an enlarged sectional view of portion D in FIG. 4.

The present invention will now be described in detail with reference to embodiments shown in the accompanying drawings. FIG. 1 is a plan view of a tire vulcanizing system having mold opening/closing and vulcanizing stations in accordance with embodiments of the present invention, FIG. 2 is a front view taken in the direction of the arrows along the line A—A of FIG. 1, showing a mold changing/preheating station and mold opening/closing and vulcanizing stations, FIG. 3 is an enlarged view of a mold opening/closing and vulcanizing station in accordance with the first embodiment shown in FIG. 2, FIG. 4 is a side view taken in the direction of the arrows along the line B—B of FIG. 1, showing a mold opening/closing and vulcanizing station, and FIG. 5 is an enlarged sectional view of portion D in FIG. 4.

As shown in FIG. 1, a tire vulcanizing system in accordance with the present invention has a mold transportation apparatus 100, a mold changing/preheating station 200, mold opening/closing and vulcanizing stations 300, tire carry-out conveyors 400, and a green tire supply apparatus 500.

The mold transportation apparatus 100 is constituted of a mold transportation carriage 101 on which a mold assembly M is placed and carriage rails 102 on which the mold transportation carriage 101 is run by driving means, not shown. The carriage rails 102 are disposed along the transportation direction of the tire mold assembly M.

The mold changing/preheating station 200 is constituted of a mold opening/closing apparatus 201, a preheating apparatus 202, a table 203 on which a used mold or a mold to be installed newly is placed temporarily, and a hoist 204 for re-stacking the mold.

The mold opening/closing station 300 is constituted of a loader 301 for a green tire, an unloader 302 for a vulcanized tire, a tire cooling apparatus 303 disposed so as to coincide with the unloading position of the unloader 302, and an unloader 304 for a cooled tire, which is disposed on the cooling apparatus 303. A cooled tire taken out by the unloader 304 is conveyed to an appropriate place by the tire carry-out conveyer 400.

The green tire supply apparatus 500, which is disposed above the mold transportation apparatus 100, is constituted of a base 501, green tire stands 502 which are disposed on the base 501 to supply a green tire to the loader 301, and an aerial carrier 503 provided over the green tire stand 502. The green tire stand 502 is adapted to reciprocate between a delivery position II for a green tire and a receiving position I for a green tire having been carried by the aerial carrier 503.

The plurality of mold opening/closing and vulcanizing stations 300, the mold opening/closing apparatus 201, and the preheating apparatus 202 are arranged substantially in parallel at predetermined intervals along the carriage rails 102 of the mold transportation apparatus 100.

FIG. 2 shows the mold opening/closing apparatus 201 and the preheating apparatus 202 of the mold changing/preheating station 200. The mold opening/closing apparatus 201 is in a state such as to receive a mold assembly M and perform work for separating an upper plate assembly M100 from a tire mold C, and the preheating apparatus 202 is in a state of preheating.

FIG. 2 also shows the mold opening/closing and vulcanizing stations 300 (300a, 300b) of a first embodiment and mold opening/closing and vulcanizing stations 300A of a second embodiment. The mold opening/closing and vulcanizing station 300a of the first embodiment on the left-hand side is in a state of vulcanization, and that on the right-hand side is in a state in which green tire GT is being supplied. The mold opening/closing and vulcanizing stations 300b of the first embodiment on both sides are in a state of vulcanization.

On the other hand, all of the mold opening/closing and vulcanizing stations 300A of the second embodiment are in a state of vulcanization.

As shown in FIG. 3, the mold opening/closing and vulcanizing station 300 comprises a pillar 306 erected at the central portion of a base frame 305 disposed independently, an elevating cylinder 307 disposed in the pillar 306, an upper movable plate (upper movable beam) 310 provided elevatably via guide rollers 309 which slide on guide rails 308 on the pillar 306, a split mold operating device 311 capable of being connected and disconnected, a connecting/disconnecting device 312 for the upper plate assembly M100 of the mold assembly M and the upper movable plate 310, a sliding/guiding device 313 for the mold assembly M, which is disposed at an appropriate place on the base frame 305 so as to be perpendicular to the carriage rails 102 of the mold transportation apparatus 100, a mold assembly positioning device 316 consisting of a V block 316a, which freely enters a V block M200b provided at an appropriate place of a lower plate assembly M200 of the mold assembly M by means of a cylinder 316b (see FIG. 5), a bladder operating/driving device 314 for performing the operation of a bladder assembly M300 incorporated in the tire mold assembly M, a heating/pressurizing medium supply device 315 for supplying a heating/pressurizing medium into a heating chamber C1a for the tire mold C of the tire mold assembly M, upper and lower heating plates M100A and M200A, and a bladder BL, the green tire loader 301 which is not shown in the figure but is well known, the well-known vulcanized tire unloader 302, the well-known tire cooling apparatus 303, and the well-known cooled tire unloader 304.

For the detailed construction of the aforementioned split mold operating device 311, Japanese Patent No. 1853184 or Japanese Patent Publication No. 5-62046 (No. 62046/1993) filed by the applicant of the present invention should be referred to. Also, for the detailed construction of the aforementioned connecting/disconnecting device 312, Japanese Patent Provisional Publication No. 9-29746 (No. 29746/1997) filed by the applicant of the present invention should be referred to. Further, the aforementioned sliding/guiding device 313 is constituted of a roller group disposed so as to hold, between the rollers, a sliding rail M700 provided on the lower surface of the mold assembly M and a support roller group for supporting the load.

For the detailed construction of the aforementioned bladder operating/driving device 314, Japanese Patent Provisional Publication No. 8-238626 (No. 238626/1996) filed by the applicant of the present invention should be referred to. Also, for the detailed construction of the aforementioned heating/pressurizing medium supply device 315, Japanese Patent Provisional Publication No. 8-238626 (No. 238626/1996) filed by the applicant of the present invention should be referred to.

The tire mold assembly M comprises the upper plate assembly M100, an upper half mold C1 and a lower half mold C2 of the well-known split mold C, the lower plate assembly M200, the bladder BL, the bladder assembly M300, a bracket M400 fixed to the upper plate assembly M100, a plurality of sets of check valves M500 for the upper heating plate M100A fixed to the bracket M400 and the heating chamber C1a of the upper half mold C1, a pressurizing piston plate M200B provided on the lower plate assembly M200, a check valve M600 for the lower heating plate fixed at an appropriate place of the lower plate assembly M200, and the rails M700 on the lower surface of the lower plate assembly M200 (for the details, refer to Japanese Patent Provisional Publication No. 9-29746 (No. 29746/1997)).

The upper movable plate 310 at the tire mold opening/closing and vulcanizing station 300 is moved vertically at the right and left sides at the same time. On the other hand, the green tire loader 301, the vulcanized tire unloader 302, the tire cooling apparatus 303, the cooled tire unloader 304, the split mold operating device 311, the connecting/disconnecting device 312 on the upper movable plate 310, the bladder operating/driving device 314, and the heating/pressurizing medium supply device 315, which are provided at each of the right and left sides, can be operated individually on the right and left sides.

On the other hand, the mold opening/closing and vulcanizing station 300A of the second embodiment only differs from that of the first embodiment in that the base frame 305 of the mold opening/closing and vulcanizing station 300 is provided continuously, and the plurality of pillars 306 are erected on the base frame 305. According to this configuration, a main pipe for supplying a heating/pressurizing medium, a main pipe for hydraulic equipment, etc. can be provided in the base frame, which offers an advantage that the equipment work in the factory can be made easy.

The mold opening/closing apparatus 201 and the preheating apparatus 202 of the mold changing/preheating station 200 differ from the mold opening/closing and vulcanizing station 300 in the following respects.

The mold opening/closing apparatus 201 and the preheating apparatus 202 are not provided with the green tire loader 301, the vulcanized tire unloader 302, the tire cooling apparatus 303, the unloader 304 for the tire cooling apparatus 303, and the bladder operating/driving device 314, and is provided with the upper movable plate 310 on the opening/closing apparatus side only. Further, since the loading and unloading of tire are unnecessary, the travel amount of the upper movable plate 310 is small, so that the height of the pillar 306 is low as shown in FIG. 2.

For the mold transportation apparatus 100, the transportation carriage 101, and the carriage rail 102, Japanese Patent Provisional Publication No. 8-192429 (No. 192429/1996) filed by the applicant of the present invention should be referred to.

(1) Description of the operation of tire vulcanization at the mold opening/closing and vulcanizing station 300

Although the mold assembly M is configured so as to be movable, it is at a standstill at each of the mold opening/closing and vulcanizing stations 300 during the tire production.

The operation will be described with reference to FIG. 3.

(a) When vulcanization is finished in the right-hand tire mold C, the heating/pressurizing medium in the bladder BL is discharged through the bladder operating/driving device 314.

During this time, the right-hand split mold operating device 311 located on the upper movable plate 310 and the right-hand connecting/disconnecting device 312 operate to connect the upper plate assembly M100 of the mold assembly M to the upper movable plate 310. On the other hand, the connecting operation of the left-hand devices 311 and 312 is not performed.

At the same time as the connecting/disconnecting device 312 operating, a tie rod head M200a of the lower plate assembly M200 is disconnected from a connecting plate M100a of the upper plate assembly M100 to make preparation for opening the mold.

(b) The piston rod of the elevating cylinder 307 is extended, by which the upper movable plate 310 is raised together with the upper plate assembly M100 and the upper half mold C1 of the mold assembly M.

When the upper movable plate 310 is raised, the split mold operating device 311 performs the well-known operation to separate the tire from the tire mold C, and rises to a predetermined height. Then, as shown in FIG. 3, by the well-known operation of the split mold operating device 311, the upper half mold C1 is closed temporarily, and succeedingly the vulcanized tire is taken out and a green tire is loaded by the well-known procedure.

Also, the upper heating plate M100A and the heating chamber C1a are disconnected from the heating/pressurizing medium supply device 315 and the check valve M500 during the time when the mold is located at the upper position. However, the heating medium in the upper heating plate M100A and the heating chamber C1a is in a state of being sealed by the check valve M500, so that the supply of heat is continued.

(c) When the loading of the green tire is finished, the upper half mold C1 having been closed temporarily is opened again by the split mold operating device 311. Subsequently, the upper movable plate 310 lowers, by which the mold is fully closed while the green tire is preformed.

(d) After the mold is fully closed, the connecting plate M100a is driven by a driving unit (not shown) to be disconnected from the connecting/disconnecting device 312 and at the same time to be connected to the tie rod head M200a of the lower plate assembly M200.

Subsequently, a pressurizing medium is supplied to the pressurizing piston plate M200B of the lower plate assembly M200 to pressurize the tire mold with a predetermined force, by which the mold is fastened so as not to be opened by the force of the heating/pressurizing medium in the bladder BL.

(e) The preparation and loading of a green tire are performed as described below.

When the vulcanization in the right-hand tire mold is finished, the green tire loader 301 for the right-hand mold rises to an appropriate height while holding an upper bead portion of a green tire GT stored on the green tire stand 502 on the base 501. The loader 301 extends to above the lower half mold C2 of the tire mold assembly M having already been opened, and supplies the green tire GT to the portion of the waiting bladder assembly M300.

The green tire stand 502 from which the green tire GT has been transferred moves from the position II to the position I, and waits at the position I until it receives the next green tire GT supplied by the aerial carrier 503.

After receiving the next green tire GT, the green tire stand 502 moves again to the position II, where it waits until the green tire loader 301 receives the green tire. Thereafter, the green tire stand 502 repeats the same operation.

(f) When the vulcanization nears completion, the vulcanized tire in the tire cooling apparatus 303 is taken out by the unloader 304, and is discharged onto the tire carry-out conveyer 400, and the tire cooling apparatus 303 makes preparation for receiving the next vulcanized tire.

On the other hand, the vulcanized tire unloader 302 takes out the tire T, and places it in the tire cooling apparatus 303, where the tire cooling operation is started through the well-known operation.

(2) Description of the operation of tire mold change (a) When the vulcanization of the final tire in the mold to be changed nears completion, the mold transportation carriage 101 moves to receive the mold assembly M, and stops there.

(b) After the final tire is carried out by the unloader 302, the mold assembly M is closed without the loading of a green tire, and the upper movable plate 310 is disconnected from the upper plate assembly M100 of the mold assembly M.

Moreover, the bladder assembly M300 of the mold assembly M is disconnected from the bladder operating/driving device 314, and also the upper and lower heating plates M100A and M200A of the tire mold assembly M and the check valves M500 and M600 for the heating chamber C1a of the upper half mold C1 are disconnected from the heating/pressurizing medium supply device 315. Thereby, the state shown at the left of FIG. 3 is established.

Also, the mold assembly positioning device 316 is disconnected, so that the mold assembly M becomes in a state of being capable of moving on the sliding/guiding device 313 of the base frame 305.

(c) At an appropriate point of time, an arm for receiving the tire mold assembly M is extended from the side of the mold transportation carriage 101 and connected to the mold assembly M, and then the arm is operated reversely to deliver the mold assembly M to the side of the mold transportation carriage 101.

(d) The mold transportation carriage 101 moves and stops in front of the mold opening/closing apparatus 201 of the mold changing/preheating station 200, and the aforementioned arm is extended to deliver the mold assembly M to the mold opening/closing apparatus 201.

(e) Next, the mold transportation carriage 101 moves to the front of the preheating apparatus 202 to receive the preheated mold assembly M, and returns the mold assembly M to the mold opening/closing and vulcanizing station 300 from which the mold assembly M has been taken out. The mold assembly M is connected to the devices on the side of the mold opening/closing and vulcanizing station 300, whereby the tire vulcanizing production is started.

(f) On the other hand, the operator removes connecting bolts for connecting the tire mold C to the upper plate assembly M100 of the mold assembly M carried into the mold opening/closing apparatus 201.

Subsequently, the upper movable plate 310 of the mold opening/closing apparatus 201 lowers, and the upper plate assembly M100 of the mold assembly M is connected to the upper movable plate 310. When the upper movable plate 310 rises, the tire mold C is left on the lower plate assembly M200.

(g) During this time, the mold transportation carriage 101, which has finished the transportation operation of the preheated mold assembly M, returns to the front of the mold opening/closing apparatus 201 and waits.

The mold transportation carriage 101 receives the mold assembly M from which the upper plate assembly M100 is removed, and moves to the position of the hoist 204 for re-stacking the tire mold C, at which position the upper half mold C1, the bladder assembly M300, and the lower half mold C2 are re-stacked.

On the table 203, the upper half mold C1, the bladder assembly M300, or the lower half mold C2 is placed.

(h) The mold assembly M into which a new tire mold C and a new bladder assembly 300 have been loaded is brought into the mold opening/closing apparatus 201. After the upper plate assembly M100 is attached to the mold assembly M, the mold assembly M is brought into the preheating apparatus 202, and is connected to the heating/pressurizing medium supply device 315, by which heating operation is started.

During this heating operation, a pressurizing medium (its pressure can be lower than that at the time of tire vulcanization) is supplied to the pressurizing piston plate M200B provided in the lower plate assembly M200 to bring the parts of the mold into close contact with each other, thereby improving the heating effect.

The preheated mold is transported by the mold transportation carriage 101 at a necessary point of time as described above.

In this case, if the mold transportation carriage 101 can carry two mold assemblies M at the same time, when the carriage 101 goes to receive the tire mold C in which the final tire has been vulcanized, it can transport the mold assembly M which has already been preheated and is to be used next. Therefore, the used mold assembly M is received at the position of the mold opening/closing and vulcanizing station 300, and can immediately be replaced with the next new mold assembly, so that the tire can be produced more efficiently.

The above is a description of the embodiments of the present invention. The present invention is not limited to the above-described embodiments, and various modifications and changes can be made without departing from the gist of the present invention.

INDUSTRIAL APPLICABILITY

As described above in detail, the present invention provides a tire vulcanizing system and a mold opening/closing and vulcanizing station therefor, in which tires can be produced efficiently without the decrease in the rate of operation of the mold opening/closing and vulcanizing station even if the frequency of mold change increases.

What is claimed is:

1. A tire vulcanizing system comprising:
   a plurality of tire mold assemblies for use in vulcanizing tires, wherein each tire mold assembly has a tire mold for containing a tire, a bladder assembly for being located in the tire within the tire mold and being supplied with a heating/pressurizing medium, a heating chamber at an outer peripheral portion of the tire mold, and upper and lower heating plates of said tire mold, wherein each of the tire mold assemblies is movable, and wherein each of the tire mold assemblies is capable of remaining closed while the bladder therein is pressurized; and
   a mold transporter configured for reciprocating in a pre-determined manner between at least one changing/preheating station and a plurality of vulcanizing stations for respectively transporting the tire mold assemblies between the changing/preheating station and the vulcanizing stations;
   wherein each vulcanizing station includes:
      a mold opening/closing mechanism mounted at the vulcanizing station and exclusively dedicated to the vulcanizing station for opening and closing a tire mold assembly that is located at the vulcanizing station, so that the vulcanizing station can independently open and close the tire mold assembly that is located at the vulcanizing station,
      a green tire loader exclusively dedicated to the vulcanizing station for loading a green tire into the tire mold assembly that is located at the vulcanizing station,
      a bladder operating/driving mechanism exclusively dedicated to the vulcanizing station for operating/driving the bladder assembly of the tire mold assembly that is located at the vulcanizing station;
      a vulcanized tire unloader exclusively dedicated to the vulcanizing station for unloading a vulcanized tire from the tire mold assembly that is located at the vulcanizing station; and
   wherein the changing/preheating station is operative for both changing the tire mold incorporated in a tire mold assembly that is located at the changing/preheating station and preheating the tire mold assembly that is located at the changing/preheating station.

2. The tire vulcanizing system according to claim 1, wherein a green tire supply means for transporting green tires to the vulcanizing stations or a vulcanized tire carry-out means for transporting vulcanized tires away from the vulcanizing stations is provided above a travel region of a transportation carriage of said mold transporter.

3. The tire vulcanizing system according to claim 1, wherein for each said mold opening/closing mechanism of each vulcanizing station, the mold opening/closing mechanism has a base frame, at least one pillar for elevation and guidance, which is erected on said base frame, an upper movable beam which can freely be moved vertically by being guided by said pillar, and connecting/disconnecting means for connecting and disconnecting said upper movable beam to and from the tire mold assembly that is located at the vulcanizing station.

4. The tire vulcanizing system according to claim 1, wherein:
   each vulcanizing station comprises a base frame, at least one pillar for elevation and guidance, which is erected on said base frame, a base for sliding tire mold assemblies that are located at the vulcanizing station, and positioning means provided on said base frame proximate right and left sides of said pillar for respectively positioning the tire mold assemblies that are located at the vulcanizing station at the right and left of the base frame,
   for each vulcanizing station, the bladder operating/driving mechanism is a first bladder operating/driving mechanism that is for being disconnected from and connected to the bladder assembly in the tire mold assembly provided at the right of said base frame,
   each vulcanizing station further includes:
      a second bladder operating/driving mechanism that is for being disconnected from and connected to the bladder assembly in the tire mold assembly provided at the left of said base frame,
      a first heating/pressurizing medium supply mechanism which is for being disconnected from and connected to the tire mold assembly provided at the right of said base frame to supply a heating/pressurizing medium into the heating chamber, the heating plates, and the bladder assembly of the tire mold assembly at the right of said base frame, and a second heating/pressurizing medium supply mechanism which is for being disconnected from and connected to the tire mold assembly provided at the left of said base frame to supply a heating/pressurizing medium into the heating chamber, the heating plates, and the bladder assembly of the tire mold assembly at the left of said base frame.

5. The tire vulcanizing system according to claim 1, wherein each vulcanizing station comprises a base frame, at least one pillar for elevation and guidance, which is erected on said base frame, an upper movable beam which can freely be moved vertically by being guided by said pillar, and connecting/disconnecting means for connecting and disconnecting said upper movable beam to and from tire mold assemblies respectively on both sides of said pillar, and for each vulcanizing station, the mold opening/closing mechanism of the vulcanizing station is configured so as to open and close the tire mold assemblies on both sides of said pillar simultaneously or individually.

6. The tire vulcanizing system according to claim 1, wherein each vulcanizing station comprising a base frame, at least one pillar for elevation and guidance, which is erected on said base frame, an upper movable beam which can freely be moved vertically by being guided by said pillar, and connecting/disconnecting means for connecting and disconnecting said upper movable beam to and from the tire mold assembly that is located at the vulcanizing station.

7. The tire vulcanizing system according to claim 1, wherein the changing/preheating station includes a mold opening/closing mechanism mounted at the changing/preheating station and exclusively dedicated to the changing/preheating station for opening and closing the tire mold assembly that is located at the changing/preheating station, so that the changing/preheating station can independently open and close the tire mold assembly that is located at the changing/preheating station.

8. The tire vulcanizing system according to claim 1, wherein for each vulcanizing station, at least one of the green tire loader and the vulcanized tire unloader of the vulcanizing station are mounted at the vulcanizing station.

9. The tire vulcanizing system according to claim 1, wherein the mold transporter includes a transportation carriage mounted for traveling along a predetermined path that extends beside the plurality of vulcanizing stations.

10. The tire vulcanizing system according to claim 9, wherein the mold transporter includes carriage rails that define the predetermined path and the transportation carriage travels along the carriage rails.

11. The tire vulcanizing system according to claim 9, wherein a first group of the vulcanizing stations are arranged adjacent and along a first elongate side of the predetermined path and a second group of the vulcanizing stations are arranged along and adjacent a second elongate side of the predetermined path, so that the predetermined path is positioned between the first and second groups of the vulcanizing stations.

12. The tire vulcanizing system according to claim 11, further comprising a plurality of tire transporters, with each of the tire transporters being either for transporting green tires to the vulcanizing stations or for transporting vulcanized tires away from the vulcanizing stations, wherein a first of the tire transporters is arranged along and adjacent a side of the first group of the vulcanizing stations so that the first group of vulcanizing stations is positioned between the first of the tire transporters and the predetermined path, a second of the tire transporters is arranged along and adjacent a side of the second group of the vulcanizing stations so that the second group of vulcanizing stations is positioned between the second of the tire transporters and the predetermined path, and a third of the tire transporters is arranged above the predetermined path.

13. The tire vulcanizing system according to claim 4, wherein the changing/preheating station includes a mold opening/closing mechanism mounted at the changing/preheating station and exclusively dedicated to the changing/preheating station for opening and closing the tire mold assembly that is located at the changing/preheating station, so that the changing/preheating station can independently open and close the tire mold assembly that is located at the changing/preheating station.

14. The tire vulcanizing system according to claim 13, wherein for each vulcanizing station, at least one of the green tire loader and the vulcanized tire unloader of the vulcanizing station are mounted at the vulcanizing station.

15. The tire vulcanizing system according to claim 13, wherein the mold transporter includes a transportation carriage mounted for traveling along a predetermined path that extends beside the plurality of vulcanizing stations.

16. The tire vulcanizing system according to claim 15, wherein the mold transporter includes carriage rails that define the predetermined path and the transportation carriage travels along the carriage rails.

17. The tire vulcanizing system according to claim 15, wherein a first group of the vulcanizing stations are arranged adjacent and along a first elongate side of the predetermined path and a second group of the vulcanizing stations are arranged along and adjacent a second elongate side of the predetermined path, so that the predetermined path is positioned between the first and second groups of the vulcanizing stations.

18. The tire vulcanizing system according to claim 17, further comprising a plurality of tire transporters, with each of the tire transporters being either for transporting green tires to the vulcanizing stations or for transporting vulcanized tires away from the vulcanizing stations, wherein a first of the tire transporters is arranged along and adjacent a side of the first group of the vulcanizing stations so that the first group of vulcanizing stations is positioned between the first of the tire transporters and the predetermined path, a second of the tire transporters is arranged along and adjacent a side of the second group of the vulcanizing stations so that the second group of vulcanizing stations is positioned between the second of the tire transporters and the predetermined path, and a third of the second of the tire transporters is arranged above the predetermined path.

19. The tire vulcanizing system according to claim 3, wherein the changing/preheating station includes a mold opening/closing mechanism mounted at the changing/preheating station and exclusively dedicated to the changing/preheating station for opening and closing the tire mold assembly that is located at the changing/preheating station, so that the changing/preheating station can independently open and close the tire mold assembly that is located at the changing/preheating station.

20. The tire vulcanizing system according to claim 6, wherein the changing/preheating station includes a mold opening/closing mechanism mounted at the changing/preheating station and exclusively dedicated to the changing/preheating station for opening and closing the tire mold assembly that is located at the changing/preheating station, so that the changing/preheating station can independently open and close the tire mold assembly that is located at the changing/preheating station.

* * * * *